(12) United States Patent
Yamamoto (10) Patent No.: US 7,323,067 B2
(45) Date of Patent: Jan. 29, 2008

(54) METHOD OF MANUFACTURING MAGNETO-RESISTANCE EFFECT TYPE HEAD

(75) Inventor: Kenrou Yamamoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 675 days.

(21) Appl. No.: 10/785,641

(22) Filed: Feb. 24, 2004

(65) Prior Publication Data

US 2005/0056346 A1    Mar. 17, 2005

(30) Foreign Application Priority Data

Sep. 11, 2003    (JP) .............................. 2003-320206

(51) Int. Cl.
*H01F 1/00* (2006.01)
*G11B 5/127* (2006.01)
(52) U.S. Cl. ................. 148/121; 29/603.07; 29/603.08
(58) Field of Classification Search ..................... None
See application file for complete search history.

(56) References Cited

U.S. PATENT DOCUMENTS 6,172,857 B1 * 1/2001 Inaguma et al. ............ 360/271
6,195,234 B1 * 2/2001 Sundaram et al. .......... 360/135
6,967,798 B2 * 11/2005 Homola et al. ............... 360/48
7,023,645 B1 * 4/2006 Emo et al. .................... 360/75

FOREIGN PATENT DOCUMENTS

| JP | 08-287460 | 11/1996 |
|----|-----------|---------|
| JP | 10-241333 | 9/1998 |
| JP | 2000-057562 | 2/2000 |

* cited by examiner

*Primary Examiner*—John P. Sheehan
(74) *Attorney, Agent, or Firm*—Greer, Burns & Crain, Ltd.

(57) ABSTRACT

A method of manufacturing a magneto-resistance effect type head that includes an element portion of magneto-resistance effect type and reproduces a read signal of data from a recording medium by the element portion, is proposed. The method includes applying a predetermined DC current to the element portion; and performing heat treatment on a part of the element portion that has been thermally deformed due to application of the DC current.

10 Claims, 6 Drawing Sheets

METHOD OF MANUFACTURING MAGNETO-RESISTANCE EFFECT TYPE HEAD

BACKGROUND OF THE INVENTION

1) Field of the Invention

The present invention relates to a magneto-resistance effect type head that records (writes) and reproduces (reads) information in and from a magnetic disk of a magnetic disk drive or a hard disk drive (HDD) included in a large-scale general-purpose computer (main frame).

2) Description of the Related Art

The currently available magnetic HDDs of computers have larger capacities. In association with an increase in the capacity of the HDDs, there has been the growing need for magnetic heads capable of supporting high density with high performance and high reliability. The magneto resistive head (MR head) disclosed in Japanese Patent Application Laid Open No. Hei 10-241333 supports high density.

MR heads are magneto-resistance effect type heads that operate based on the magneto-resistance effect. The MR heads have magneto-resistance effect type elements for use as a head for reproduction. Electric resistance of the magneto-resistance effect type element vanes according to intensity of the magnetic field applied. The MR heads have better sensitivity to magnetic field as compared to the thin film heads. Therefore, the MR heads output a read signal with high output even if the recording density is high, without depending on speed of a recording medium (magnetic disk).

The MR head is assembled by a slider for fixing the MR head and a flat spring (suspension) to form a head gimbal assembly (HGA), and the HGA is mounted on a magnetic disk drive. The MR head serves to only read the data, and therefore, the thin film head is used to write the data.

Conventionally, when the MR head is to be manufactured, an annealing treatment (heat treatment) is first executed to the MR head, and after the MR head is assembled with the suspension to form a HGA (after HGA is finished), a magnetic field applying process (100 to 30000 e) is executed to the HGA. The magnetic field applying process is executed because directions of easy magnetization are made to an identical direction to correct deviation in a direction of magnetic intensity. In other words, if a write signal is varied (variation in level of the write signal) when data is to be written to a magnetic disk (recording medium), deficiency such as inaccurate data read (reproduction) may occur. Therefore, it is required to perform write using a constant output signal without variations in its output. In the conventional technology, by performing the annealing treatment (heat treatment) on the MR head and the magnetic field applying process on the HGA, it is possible to stabilize outputs, i.e., variations in intensity of a signal used to read.

However, the method of manufacturing a magneto-resistance effect type head in the conventional technology has a problem as follows. That is, in this method, outputs are stabilized by executing the magnetic field applying process after the annealing treatment (heat treatment) is performed on the MR head and the MR head is finished as HGA during a manufacturing process of the MR head.

The current stat of this technology is such that even if such an annealing treatment (heat treatment) and a magnetic field applying process are executed, there are still many MR heads that have output variations. As a measure to resolve the output variations, there is also a method of subjecting the MR head to heat treatment while executing the magnetic field applying process after HGA is finished. In the case of the processing method, heat treatment is executed to the whole except for an element portion forming the MR head, which causes occurrence of pealing of the MR head due to deformation of the suspension forming the HGA and degradation (heating) of an adhesive used to fix the MR head. As a result, it is impossible to set a heat treatment temperature for the HGA to high, and therefore, insufficient heat treatment is executed. Thus, it is impossible to stabilize output variations.

SUMMARY OF THE INVENTION

It is an object of the present invention to solve at least the problems in the conventional technology.

A method according to the present invention is a method of manufacturing a magneto-resistance effect type head that includes an element portion of magneto-resistance effect type and reproduces a read signal of data from a recording medium by the element portion, is proposed. The method includes applying a predetermined DC current to the element portion; and performing heat treatment on a part of the element portion that has been thermally deformed due to application of the DC current.

The other objects, features, and advantages of the present invention are specifically set forth in or will become apparent from the following detailed descriptions of the invention when read in conjunction with the accompanying drawings.

DETAILED DESCRIPTION

Exemplary embodiments of the method of manufacturing a magneto-resistance effect type head according to the present invention are explained in detail below with reference to the accompanying drawings.

Figure 1:
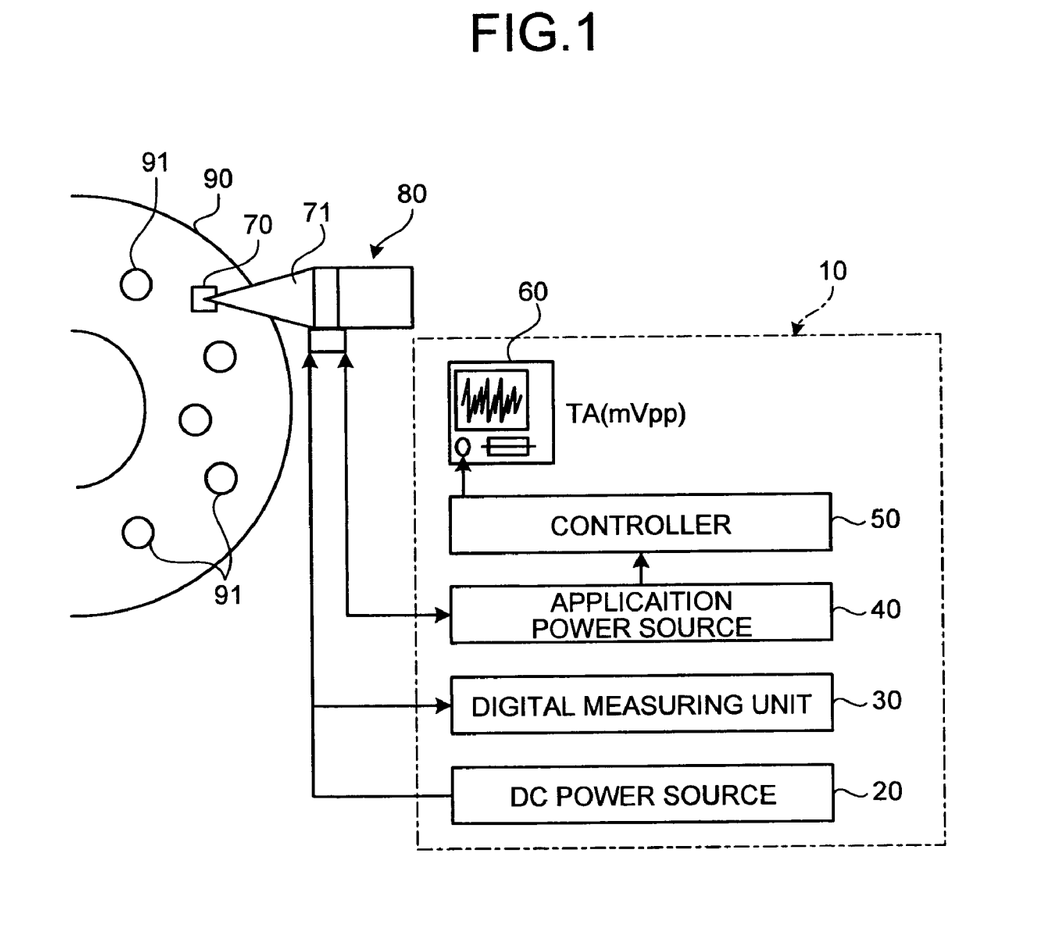
FIG. 1 is a diagram of an overall configuration of a magnetic output stabilizer according to an embodiment of the present invention.

FIG. 1 is a diagram of an overall configuration of a magnetic output stabilizer 10 for realizing a method of manufacturing a magneto-resistance effect type head according to an embodiment of the present invention.

The present invention has been achieved based on such a phenomenon that a part of an element portion forming an MR head (magnetic head) is made to protrude because of thermal expansion (thermal deformation) due to current conduction when a DC current is applied (conducted) to the element portion (magneto resistance effect type element portion). Collision of a bump (ring-shaped protrusion) of a laser bump disk with the protrusion of the element portion allows a local (partial) annealing treatment (heat treatment) to the element portion.

More specifically, the MR head is finished as a head gimbal assembly (HGA), and the HGA is made to fly above the rotating laser bump disk. A DC current is applied (conducted) to a write coil forming the MR head, which causes the element portion to be thermally deformed (thermally expanded). The bump (ring-shaped protrusion) formed on the laser bump disk is made to collide with the local part of the element portion protruded through the thermal deformation, and heat (Joule heat) produced by the collision is used to perform the heat treatment on the element portion.

In other words, the collision allows only the element portion to be locally, thermally treated. Therefore, it is possible to avoid deficiency such as deformation of the suspension and pealing of the MR head and also to perform sufficiently the heat treatment on the MR head. As a result, it is possible to suppress variations in output and to manufacture high-reliability MR heads (magneto-resistance effect type heads).

Figure 2:
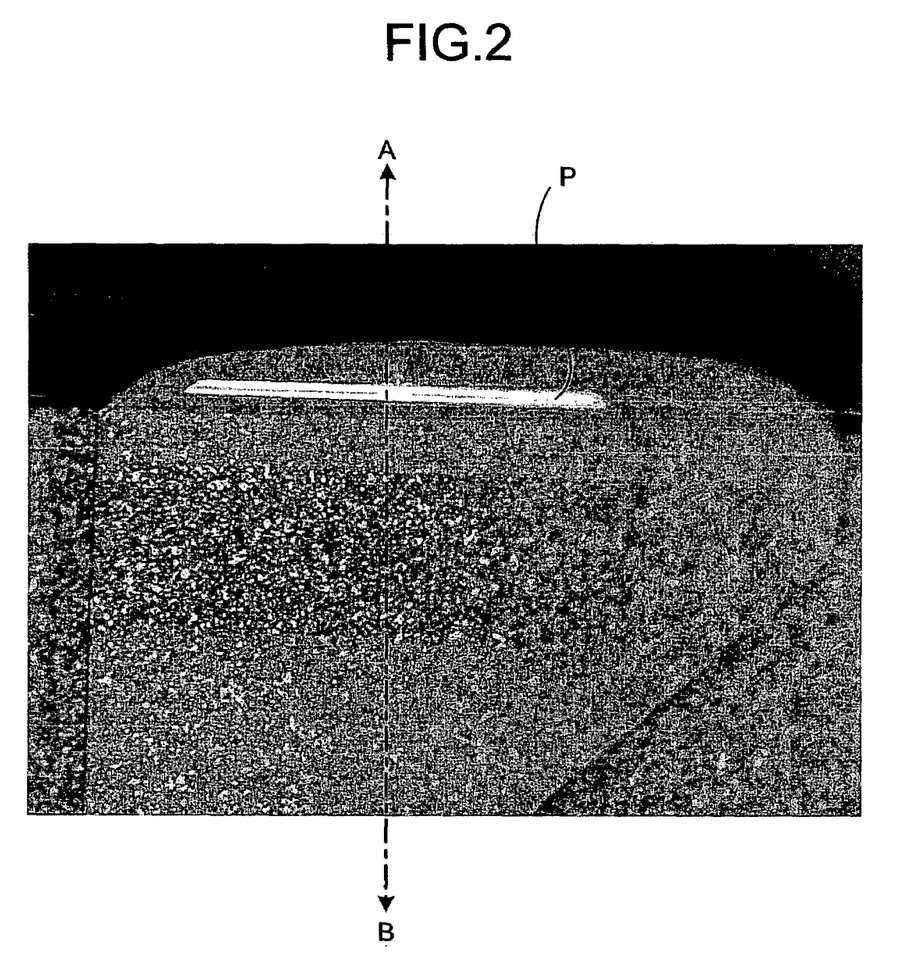
FIG. 2 is an enlarged view of an element portion of an MR head.
Figure 3:
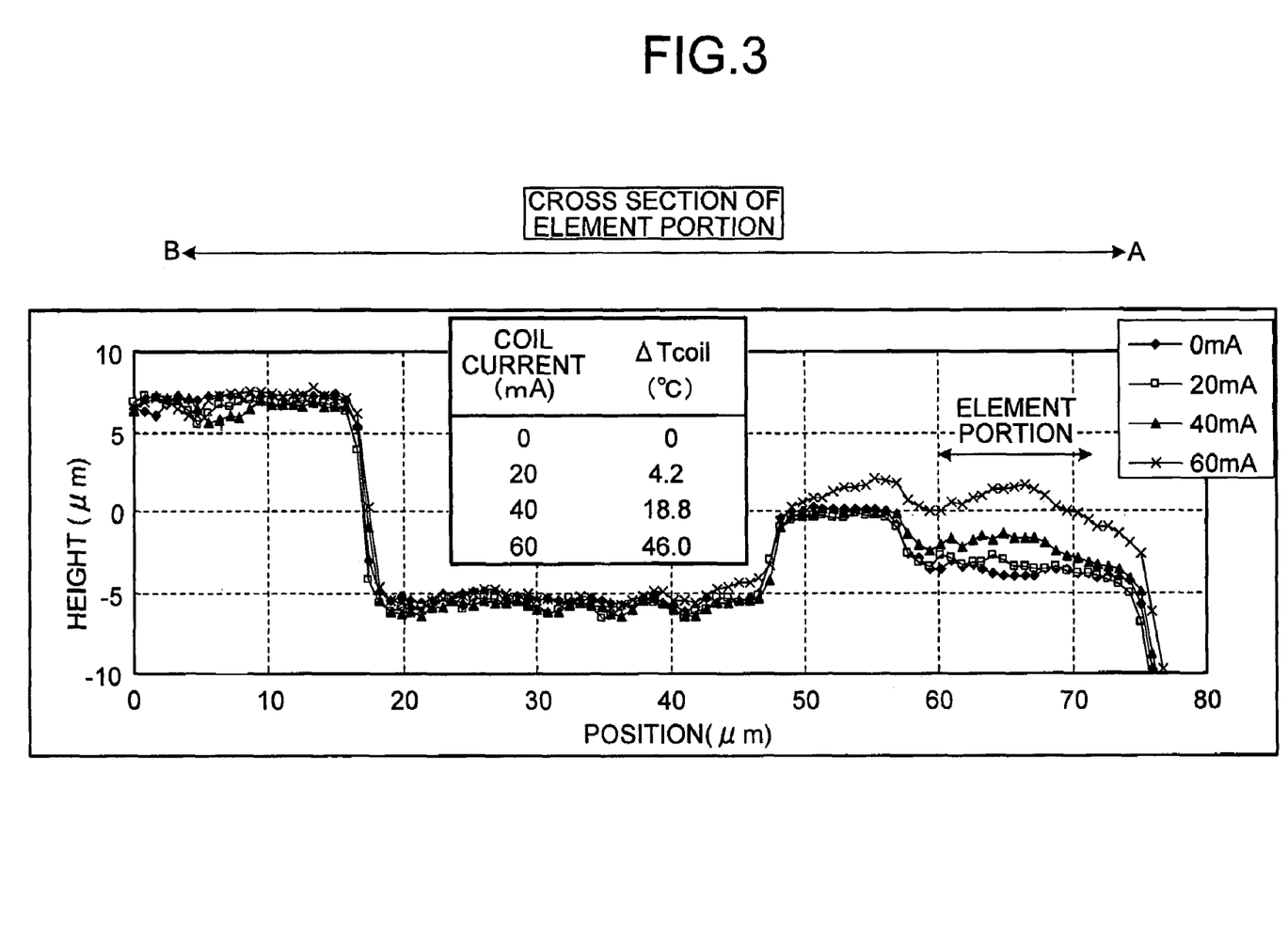
FIG. 3 is a characteristic diagram for explaining how the element portion protrudes when a DC current is applied.

The protrusion phenomenon of the element portion is explained below in a simple manner with reference to FIG. 2 and FIG. 3. FIG. 2 is an enlarged view of an element portion P of the MR head due to application (current conduction) of a DC current. FIG. 3 is a cross section taken along line A-B of FIG. 2, and the protrusion phenomenon of the element portion P is shown therein where a height (in micrometer (μm)) of the cross section of the element portion P is plotted on the y axis and a position (μm) thereof is plotted on the x axis. The element portion P is a portion to actually read and write information. In testing experiments of the embodiment, a current value to be applied to the element portion P is gradually increased (0 milliampere (mA), 20 mA, 40 mA, and 60 mA), and it is checked how the element portion P is protruded by the thermal expansion (thermal deformation) due to the increase in the applied current.

As shown in FIG. 3, some portion (60 μm to 70 μm) of the element portion P protrudes by about 3 μm when the current applied to the element portion P is gradually increased from 0 mA to 60 mA. As explained above, the partial protrusion of the element portion P caused by application of DC current thereto is used to perform heat treatment on the protrusion. In other words, the protrusion produced on the element portion P and the bump 91 (ring-shaped protrusion 93 (FIG. 4)) formed on the laser bump disk 90 are caused to collide with each other. The heat (Joule heat) produced at the time of collision is used to perform heat treatment on the element portion P. The method of manufacturing the magneto-resistance effect type head is realized by the magnetic output stabilizer 10 shown in FIG. 1.

The magnetic output stabilizer 10 includes a DC power source 20 for applying a DC current to the magneto-resistance effect type element portion, a digital measuring unit 30, an application power source 40, and a controller 50. The magnetic output stabilizer 10 further includes an oscilloscope 60 for displaying a measured current (or voltage).

Reference numeral 70 represents the MR head used as a magnetic head for reproduction as a target of the present invention. The MR head 70 is combined with a thin film head for recording to form the magnetic head for recording/reproduction. Furthermore, the MR head 70 has a read terminal for a magneto-resistance effect type head and a write terminal for a recording head. A slider (a chip of about 1 mm to 2 mm square) and a suspension 71 (specific flat spring) form an HGA 80. More specifically, the slider fixes the MR head 70 to a tip of the suspension 71 and the suspension 71 has a movable part such as a gimbal. A laser bump disk 90 includes a plurality of bumps 91, which is explained in detail later.

The DC power source 20 has a function of applying a DC current (write current Iw) to a write coil of the MR head 70 (Iw=DC 100 mA). The digital measuring unit 30 has a function of detecting (monitoring) a temperature in the write coil using a monitor by measuring a voltage (potential difference) and a resistance. More specifically, the digital measuring unit 30 monitors the temperature of the element portion P that thermally expands by application of the DC current thereto.

The application power source 40 has a function of applying a transistor current Is (Head Ic) for amplification to the read element portion that forms the MR head 70. The applied current in this case is a current value of a weak current (Is=about 2.9 mA) for monitoring preheating in the read element portion. Collision of the bump 91 of the laser bump disk 90 with the element portion P (write element portion) of the MR head 70 produces so-called thermal asperity. In this case, changes in temperature of the read element portion according to the impact of the collision are monitored by the oscilloscope 60. The thermal asperity is a phenomenon such that element resistance is increased by collision energy or heat produced by friction and that variations in output are detected by variations of a base line of a read signal. The controller 50 has a function of controlling a transistor current (Head Ic) applied to the read element portion by the application power source 40.

Figure 4:
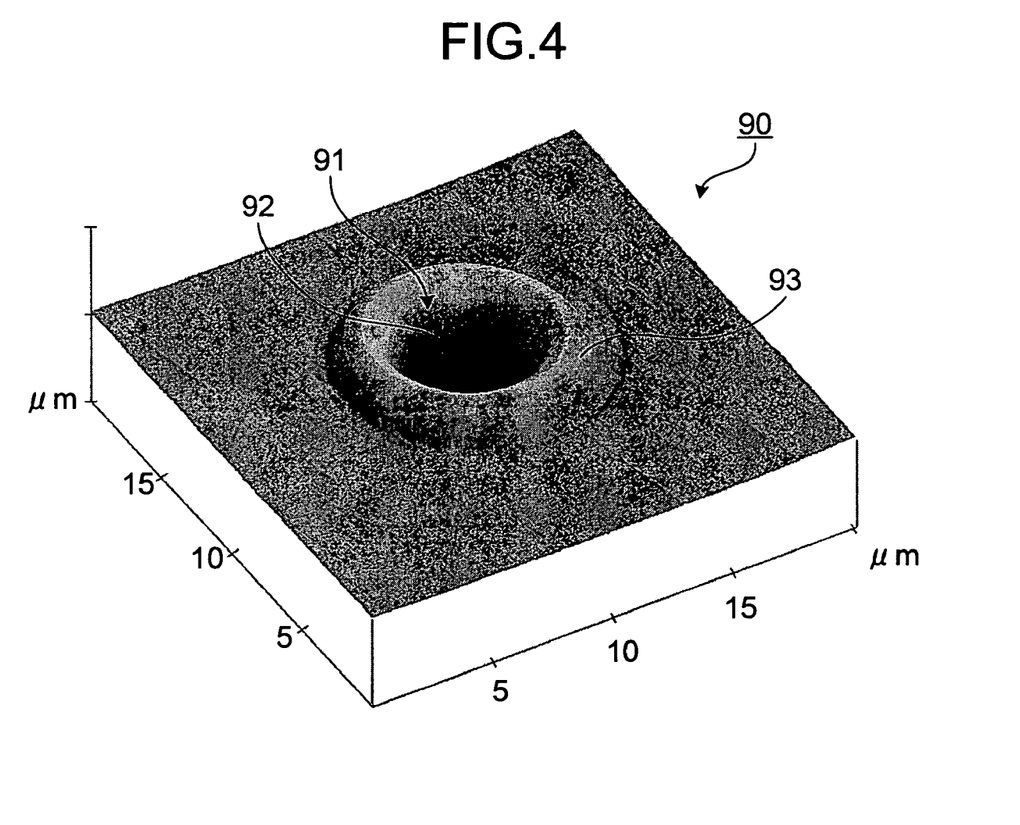
FIG. 4 is an enlarged perspective view of a key section of a laser bump disk.

The laser bump disk 90 is explained in detail below. FIG. 4 is an enlarged perspective view of the surface of the laser bump disk 90 observed by an atomic force microscope (AFM). The protrusion produced on the element portion P of the MR head 70 is made to collide with the surface of the laser bump disk 90 to be used for locally performing heat treatment. Therefore, a plurality of crater-shaped bumps 91 is formed on the surface of the laser bump disk 90. The bump 91 includes a recess 92 provided at the central part of the bump 91 that is lower than the nominal surface of the laser bump disk 90, and the ring-shaped protrusion 93 that surrounds the recess 92 (height: 7 μm, diameter: 7 μm, and formed at 100μ pitches within a radius of 20 to 45 mm).

The height of the ring-shaped protrusion 93 is set so as to be slightly higher than the nominal surface of the bump disk. Further, the bumps 91 are spirally formed over the whole area of the laser bump disk 90. Therefore, the element portion P of the MR head 70 obtained by thermal deformation due to application of the DC current thereto can be made to collide with the bump irrespective of positions of the element portion P. The method of forming the bump 91 can be realized in the same manner as the method of forming the bump on a contact start stop (CSS) zone where the MR head is held in standby when data read or data write is finished.

Figure 5:
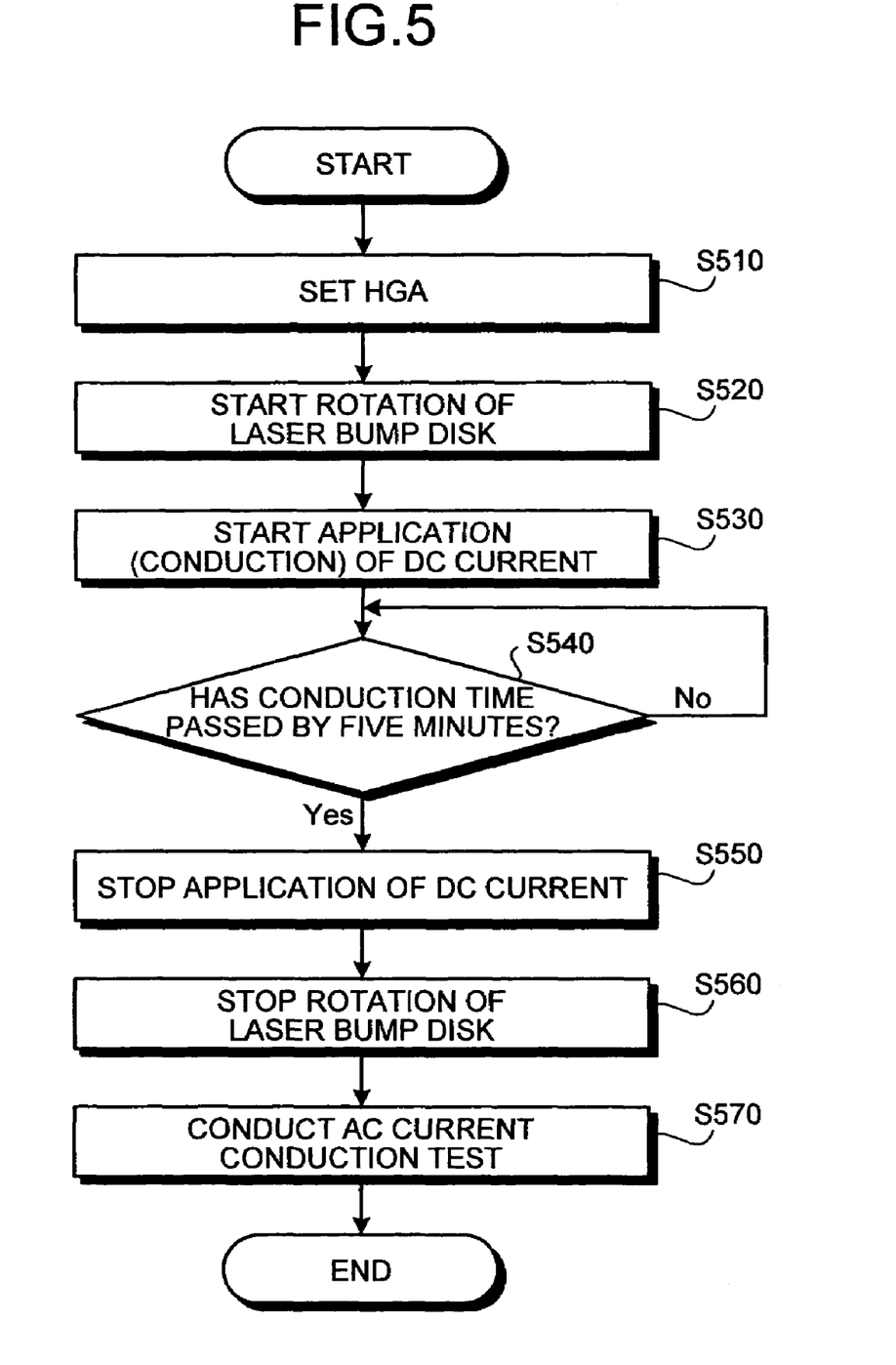
FIG. 5 is a flowchart of the method of manufacturing a magneto-resistance effect type head according to the embodiment.

The method of manufacturing the magneto-resistance effect type head is explained in detail below. FIG. 5 is a flowchart of a manufacturing process of the magneto-resistance effect type head. A finished product of the HGA 80 including the MR head 70 is set on a location that faces the top surface of the laser bump disk 90 (step S510). Any known manufacturing process may be used to obtain the finished product of the HGA 80. The laser bump disk 90 is then started to rotate (step S520). The rotation of the laser bump disk 90 allows the HGA 80 to lift off above the laser bump disk 90. The HGA 80 is slid with respect to the laser bump disk 90 under a predetermined condition (circumferential speed: 41 m/s, Yaw angle: 15 degrees).

A DC current (write current Iw) is applied to the write coil of the MR head 70 (step S530). More specifically, a current of DC 100 mA is passed through a write element (write coil) of the MR head 70 from the DC power source 20. At this time, the digital measuring unit 30 measures a temperature and a thermal asperity (TA) output of the write coil, and the oscilloscope 60 monitors them.

As explained above, the element portion P of the MR head 70 has such a feature that it is thermally expanded by application (conduction) of the DC current thereto (FIG. 3). Therefore, the application causes the element portion P (a part of the element portion) to be thermally deformed to be protruded. Consequently, the protrusion of the element portion P collides with the ring-shaped protrusion 93 of the rotating laser bump disk 90. The collision allows local heat treatment to be performed on the element portion P of the MR head 70. In this case, the heat treatment is not performed on the overall MR head 70 but on a part of the local part of the element portion P unlike the conventional technology. Therefore, it is possible to prevent deficiencies such as peeling of the MR head 70 and deformation of the suspension due to heat treatment.

It is determined whether a collision time between the ring-shaped protrusion 93 and the element portion P has passed by five minutes (step S540). If it is determined at step S540 that the collision time has passed by five minutes (step S540, Yes), then current conduction (application) by the DC power source 20 to the write coil is stopped (step S550), and the rotation of the laser bump disk 90 is made to stop (step S560).

Figure 6:
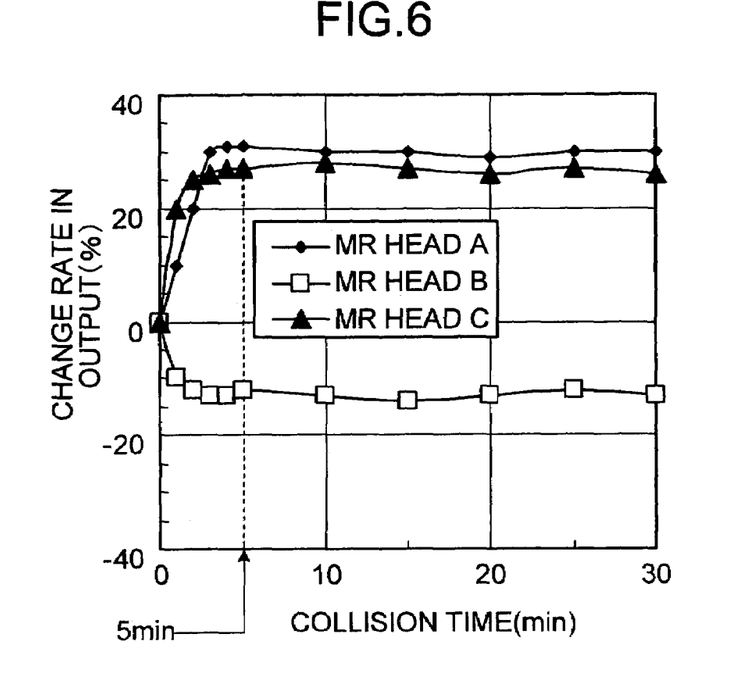
FIG. 6 is a characteristic diagram of aging variations of magnetic output by the MR head.

At step S540, the collision time is set to "five minutes" and this setting (the ground of the setting) is explained in detail below with reference to FIG. 6. FIG. 6 is a characteristic diagram of aging variations in output values by the MR head 70. In this figure, a change rate (%) in output is plotted on the y axis, and the collision time (min) between the ring-shaped protrusion 93 of the laser bump disk 90 and the element portion P is plotted on the x axis.

In the experiments, three MR heads (MR head A, MR head B, and MR head C) for testing are used to measure each change rate, as aging variations, in output of the MR heads A to C corresponding to the collision times. As shown in FIG. 6, it is understood that the change rates in outputs of all the three MR heads A to C are stabilized after about five minutes have elapsed (collision time=5 minutes) (stabilization of variations in output, or convergence of the change rates in peak-to-peak output). As explained above, the collision time is set to five minutes, and the heat treatment performed in such a short time (five minutes) allows the efficient manufacturing process (time) to be largely reduced.

Referring back to the flowchart of FIG. 5, the processing procedure using the method of manufacturing the magneto-resistance effect type head is explained below. An AC current conduction test is conducted on the HGA 80 that is finished through the manufacturing process from step S510 to step 560 (step S570) to end the manufacturing process. The effects of the method are explained below with reference to FIG. 7.

Figure 7:
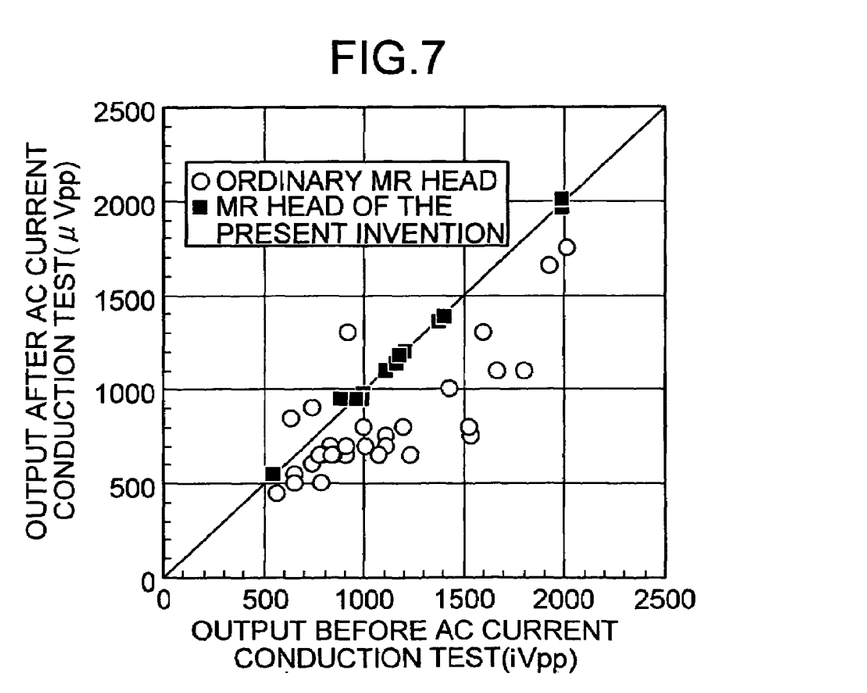
FIG. 7 is a characteristic diagram of results of testing by AC current conduction tests.

FIG. 7 is a characteristic diagram of the effects of the method. In other words, FIG. 7 is a characteristic diagram of results of AC current conduction tests conducted on the MR head obtained by using the method of the present invention and an ordinary MR head as targets for testing. In this figure, output values (μVp-p) of the MR heads after the AC current conduction test is conducted are plotted on the y axis, and output values (iVp-p) of the MR heads before the AC current conduction test is conducted are plotted on the x axis.

The solid squares in FIG. 7 indicate variations in output of the MR head obtained by using the method of the present invention, and the hollow circles indicate variations in output of the ordinary MR head obtained by using a conventional manufacturing method. The setting conditions required for the AC current conduction tests are as follows, write current during write: 45 mA, write frequency: 450 megahertz, continuous write: every other cycle, application time: 5 minutes, and sense current: 3 mA. The AC current conduction test mentioned here indicates a test of measuring variations in output (μ Vp-p) by applying an AC current to a finished MR head. If variations in output of an MR head are detected through the AC current conduction test, the MR head is excluded as a defective.

It is clear from FIG. 7, the MR head manufactured using the method of the present invention has a smaller variation in output as compared with that of the conventional MR head (magnetic head). As a result, a highly reliable MR head can be assembled as HGA, and therefore it is possible to prevent occurrence of the defectives, thus, achieving decreased manufacturing steps and largely reduced costs. The element portion P after collision was observed in the tests. It is apparent from the observation that no damage and dirt exist on the element portion P due to the collision of the element portion P with the bump 91 of the laser bump disk 90.

As explained above, in the method of manufacturing the magneto-resistance effect type head of the present invention, the MR head is finished as an HGA, and a DC current is applied (conducted) to the write coil that forms the MR head. The current conduction allows the element portion to be thermally deformed (thermally expanded), and the bump (ring-shaped protrusion) of the laser bump disk is made to collide with a portion protruded by the thermal deformation. The heat (Joule heat) produced by the collision is used to perform local heat treatment on the element portion. Therefore, it is possible to manufacture the highly reliable magneto-resistance effect type head capable of supporting high density and with less variation in output.

In the embodiment, the MR head is used as a magnetic head that forms the HGA. However, the method according to the present invention is applicable to, in addition to the above-mentioned MR head, a giant magneto resistive (GMR) head using giant magneto-resistance effects or an anisotropic magneto resistive (AMR) head using anisotropic magneto-resistance effects.

According to the method of manufacturing the magneto-resistance effect type head of the present invention, it is possible to realize the magneto-resistance effect type head capable of supporting high density through sufficient heat treatment on the magneto-resistance effect type head and maintaining excellent reproducibility (high reliability).

Moreover, it is possible to prevent manufacturing defective heads and achieve a high yielding percentage.

Furthermore, it is possible to reliably perform annealing treatment locally on the element portion using the ring-shaped protrusion of the bump that is formed on the laser bump disk.

Moreover, it is possible to efficiently perform the heat treatment on the magneto-resistance effect type head in a short period of time (five minutes) and also achieve decreased manufacturing steps and largely reduced costs.

Furthermore, it is possible to cause the element portion of the magneto-resistance effect type head that has been protruded by thermal deformation through application of the DC current thereto to reliably collide with the bump of the laser bump disk. The collision is made without any operation for registration, and heat treatment is performed on the element portion.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A method of manufacturing a magneto-resistance effect type head, the magneto-resistance effect type head that includes an element portion of magneto-resistance effect type and reproduces a read signal of data from a recording medium by the element portion, comprising:
    applying a predetermined DC current to deform the element portion thermally; and
    performing heat treatment on a deformed part of the element portion.

2. The method according to claim 1, wherein the performing includes causing a surface of a bump disk to collide with the deformed part of the element portion.

3. The method according to claim 2, wherein the bump disk is a laser bump disk.

4. The method according to claim 3, wherein the laser bump disk and the deformed element portion are made to collide for five minutes.

5. The method according to claim 2, wherein a plurality of bumps each having a ring-shaped protrusion and a recess is spirally formed on the bump disk.

6. The method according to claim 1, further comprising:
    forming the magneto-resistance effect type head with a write element and a read element; and
    applying a weak current to the read element.

7. A method of manufacturing a magneto-resistance effect type head, the magneto-resistance effect type head that includes an element portion of magneto-resistance effect type and reproduces a read signal of data from a recording medium by the element portion, comprising:
    applying a predetermined DC current to the element portion;
    performing heat treatment on a part of the element portion that has been thermally deformed due to application of the DC current; and
    wherein the performing includes causing a surface of a bump disk to collide with the part of the element portion.

8. The method according to claim 7, wherein the bump disk is a laser bump disk.

9. The method according to claim 8, wherein the laser bump disk and the element portion are made to collide for approximately five minutes.

10. The method according to claim 7, wherein a plurality of bumps each having a ring-shaped protrusion and a recess is spirally formed on the bump disk.

* * * * *